US011034852B2

(12) United States Patent
Saito et al.

(10) Patent No.: US 11,034,852 B2
(45) Date of Patent: Jun. 15, 2021

(54) COATED BODY AND BUILDING EXTERIOR MEMBER

(71) Applicant: AGC Inc., Chiyoda-ku (JP)

(72) Inventors: Shun Saito, Chiyoda-ku (JP); Shiro Ebata, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 174 days.

(21) Appl. No.: 16/002,429

(22) Filed: Jun. 7, 2018

(65) Prior Publication Data
US 2018/0282570 A1 Oct. 4, 2018

Related U.S. Application Data

(63) Continuation of application No. PCT/JP2016/087427, filed on Dec. 15, 2016.

(30) Foreign Application Priority Data

Dec. 18, 2015 (JP) .............................. JP2015-247664

(51) Int. Cl.

| | | |
|---|---|---|
| C09D 127/16 | (2006.01) | |
| C09D 127/12 | (2006.01) | |
| C09D 175/04 | (2006.01) | |
| C09D 7/40 | (2018.01) | |
| C09D 7/61 | (2018.01) | |
| C09D 5/00 | (2006.01) | |
| B32B 15/08 | (2006.01) | |
| B32B 27/18 | (2006.01) | |
| B32B 27/30 | (2006.01) | |
| C08G 18/24 | (2006.01) | |
| C08G 18/62 | (2006.01) | |
| C08G 18/79 | (2006.01) | |
| C08G 18/80 | (2006.01) | |
| B05D 7/24 | (2006.01) | |
| B05D 1/38 | (2006.01) | |
| B05D 3/02 | (2006.01) | |
| B05D 7/14 | (2006.01) | |
| B05D 7/00 | (2006.01) | |
| C08F 214/24 | (2006.01) | |
| C08K 3/22 | (2006.01) | |

(52) U.S. Cl.
CPC ............ *C09D 127/16* (2013.01); *B05D 1/38* (2013.01); *B05D 3/0254* (2013.01); *B05D 7/14* (2013.01); *B05D 7/24* (2013.01); *B05D 7/544* (2013.01); *B32B 15/08* (2013.01); *B32B 27/18* (2013.01); *B32B 27/30* (2013.01); *C08G 18/246* (2013.01); *C08G 18/6279* (2013.01); *C08G 18/792* (2013.01); *C08G 18/8061* (2013.01); *C09D 5/00* (2013.01); *C09D 7/40* (2018.01); *C09D 7/61* (2018.01); *C09D 127/12* (2013.01); *C09D 175/04* (2013.01); *C08F 214/247* (2013.01); *C08K 2003/2241* (2013.01)

(58) Field of Classification Search
CPC ....................................... C09D 127/12–127/20
See application file for complete search history.

(56) References Cited

U.S. PATENT DOCUMENTS

| | | | | |
|---|---|---|---|---|
| 6,153,697 A | * | 11/2000 | Montague | .......... C08G 18/6275 525/123 |
| 2009/0239993 A1 | * | 9/2009 | Sumi | .................... C09D 127/12 524/544 |

FOREIGN PATENT DOCUMENTS

| | | |
|---|---|---|
| EP | 3 050 933 A1 | 8/2016 |
| JP | 5-86320 | 4/1993 |
| JP | 6-218325 | 8/1994 |
| JP | 2012-86505 | 5/2012 |
| JP | 2015-875 | 1/2015 |
| WO | WO 2015/137286 A1 | 9/2015 |

OTHER PUBLICATIONS

Machine translation of JP 2012-086505 (Year: 2012).*
International Search Report dated Mar. 14, 2017 in PCT/JP2016/087427, filed on Dec. 15, 2016 (with English Translation).

* cited by examiner

*Primary Examiner* — Ramsey Zacharia
(74) *Attorney, Agent, or Firm* — Oblon, McClelland, Maier & Neustadt, L.L.P.

(57) ABSTRACT

To provide a coated body excellent in weather resistance and excellent also in pressure marking resistance. The coated body comprises a substrate, an undercoating film, a prescribed intermediate coating film and a top coating film formed by curing a top coating material comprising the following components (1) to (3), in this order: (1) a fluorinated polymer having hydroxy groups or carboxy groups; (2) a curing agent for curing the fluorinated polymer; and (3) a prescribed ultraviolet absorber.

16 Claims, No Drawings

COATED BODY AND BUILDING EXTERIOR MEMBER

TECHNICAL FIELD

The present invention relates to a coated body and a building exterior member.

BACKGROUND ART

A coated metal plate having a fluororesin coating film (a fluororesin-coated metal plate) is excellent in weather resistance, and thus is utilized in a field where a request for maintenance free is high, e.g. as a building exterior member.

In recent years, in applications where high design properties are required for e.g. metallic coated metal plates, the demand for a fluororesin-coated metal plate with a coating film having various pigments combined, is expanding rapidly.

Patent Document 1 discloses a coated steel plate which comprises "1) a steel plate (original plate to be coated), 2) an undercoating film (primer coating film) formed on the surface of the steel plate, 3) an intermediate coating film (colored metallic coating film) formed on the undercoating film and containing aluminum particles and a coloring pigment, and 4) a top coating film (clear coating film) formed on the intermediate coating film and containing titanium oxide particles". Thus, in Patent Document 1, a top coating film is used for maintaining the bright paint color of the intermediate coating film for a long period of time, and in Examples in Patent Document 1, a top coating film comprising a polyvinylidene fluoride and an acrylic resin, is disclosed.

PRIOR ART DOCUMENT

Patent Document

Patent Document 1: JP-A-2012-86505

DISCLOSURE OF INVENTION

Technical Problem

On the other hand, in recent years, a fluororesin-coated metal plate is required to have various properties from the spread of its applications.

For example, a fluororesin-coated metal plate is required to have superior weather resistance than before. More specifically, even if used outdoors for a long period of time, it is required that the coating film is less likely to peel.

The present inventors have made a study for the weather resistance of the fluororesin-coated metal plate disclosed in Patent Document 1, and as a results, it has been confirmed that peeling of the coating film is likely to occur by an exposure test for a long period of time, and its weather resistance has been found not to satisfy the level required recently.

Further, the fluororesin-coated metal plate is also required to be excellent in pressure marking resistance. The pressure marking is meant for such a phenomenon that when the fluororesin-coated metal plate is stored in a coiled state or in a stacked state, a strong pressure is exerted on the coated surface, whereby the surface state (e.g. gloss, etc.) of the coating film is changed.

In view of the above circumstances, it is an object of the present invention to provide a coated body excellent in weather resistance and excellent also in pressure marking resistance.

Further, it is another object of the present invention to provide a building exterior member comprising the coated body.

Solution to Problem

The present inventors have conducted extensive studies by paying attention to, as a problem of the prior art, such a possibility that the top coating film is insufficient in weather resistance, and the intermediate coating film is deteriorated by ultraviolet rays having passed through the top coating film. As a result, they have found it possible to solve this problem by a coated body of so-called three-coat, wherein a top coating film having a prescribed top coating material cured, is formed on an intermediate coating film containing a pigment, a polyvinylidene fluoride and an acrylic resin.

That is, the present inventors have found it possible to solve the above problem by the following constructions.

[1] A coated body comprising a substrate, an undercoating film, the following intermediate coating film and the following top coating film in this order, Intermediate coating film: a coating film formed from an intermediate coating material comprising a pigment, a polyvinylidene fluoride and a (meth)acrylic resin, wherein the mass ratio of the polyvinylidene fluoride to the (meth)acrylic resin (i.e. the mass ratio of the polyvinylidene fluoride/the (meth)acrylic resin) is from 50/50 to 90/10, Top coating film: a coating film formed by curing a top coating material comprising the following (1) to (3):

(1) a fluorinated polymer having hydroxy groups or carboxy groups, (2) a curing agent for curing the fluorinated polymer, (3) at least one ultraviolet absorber selected from the group consisting of an inorganic ultraviolet absorber, a salicylate-type ultraviolet absorber, a benzotriazole-type ultraviolet absorber, a hydroxyphenyl triazine-type ultraviolet absorber, a benzophenone-type ultraviolet absorber and a cyanoacrylate-type ultraviolet absorber.

[2] The coated body according to [1], wherein the elongation of the top coating film is from 50 to 200%.

[3] The coated body according to [1] or [2], wherein the breaking stress of the top coating film is from 5.0 to 40.0 MPa, and the glass transition temperature of the top coating film is from −15 to 40° C.

[4] The coated body according to any one of [1] to [3], wherein the fluorinated polymer comprises units based on a fluoroolefin, units based on a monomer having a hydroxy group or carboxy group, and units based on a monomer having a $C_{2-12}$ chain alkyl group.

[5] The coated body according to any one of [1] to [3], wherein the fluorinated polymer comprises units based on a fluoroolefin, units based on a monomer having a hydroxy group, and units based on a monomer having a $C_{2-12}$ chain alkyl group, and has a hydroxy value of from 20 to 200 mg KOH/g.

[6] The coated body according to [4] or [5], wherein the content of the units based on a monomer having the above chain alkyl group is at least 30 mol %, to all units in the fluorinated polymer.

[7] The coated body according to any one of [1] to [6], wherein the curing agent is a curing agent having an isocyanate group or a blocked isocyanate group.

[8] The coated body according to any one of [1] to [7], wherein the pigment contains titanium oxide.
[9] The coated body according to any one of [1] to [8], wherein the undercoating film is a coating film formed from a coating material containing a (meth)acrylic resin, a polyester resin or an epoxy resin.
[10] The coated body according to any one of [1] to [9], wherein the substrate is a metal plate.
[11] A building exterior member comprising a coated body as defined in any one of [1] to [10].

Advantageous Effects of Invention

According to the present invention, it is possible to provide a coated article excellent in weather resistance and excellent also in pressure marking resistance.

Further, according to the present invention, it is also possible to provide a building exterior member comprising the coated body.

DESCRIPTION OF EMBODIMENTS

In the following, preferred embodiments of the coated body and building exterior member of the present invention will be described in detail.

In this specification, units formed directly by polymerization of a monomer and units obtainable by chemically converting portions of the units formed by polymerization of a monomer, are generically referred to as "units". In the present invention, the contents (mol %) of the respective units in the polymer are obtainable by analyzing the polymer by a nuclear magnetic resonance spectroscopy, but they can also be estimated from the charged amounts of the respective monomers.

Further, a (meth)acrylic resin is a general term for an acrylic resin and a methacrylic resin; (meth)acrylic acid is a general term for acrylic acid and methacrylic acid; and a (meth)acrylate is a general term for an acrylate and a methacrylate.

First, characteristic points of the present invention as compared with the prior art will be described in detail.

One characteristic point of the present invention may be such a point that the top coating film of the coated body is made of a coating film obtained by curing a top coating material comprising a prescribed fluorinated polymer, a curing agent and an ultraviolet absorber. The present inventors assume that the reason as to why the effects of the present invention are obtainable is as follows, but the scope of the present invention should not be construed as limited by such an assumption.

According to a result of the study made by the present inventors about causes whereby peeling of the coating film is likely to occur in the prior art, as the main cause, it may be mentioned that the acrylic resin contained in the top coating film undergoes degradation deterioration by ultraviolet rays incident from outside of the coated body. Further, as another cause, deterioration of the polyvinylidene fluoride itself contained in the top coating film may be mentioned.

Therefore, in the present invention, the top coating film is formed by using a curable fluorinated polymer having hydroxy groups or carboxy groups, thereby to prevent the above-mentioned problems from occurring.

Further, as another cause for peeling of the coating film, interfacial deterioration between the intermediate coating film and the top coating film may be mentioned. Therefore, in the present invention, an ultraviolet absorber is incorporated in the top coating film, so as to let ultraviolet rays entering the top coating film be absorbed by the top coating film, and to let the ultraviolet rays hardly reach the intermediate coating film. As a result, the degradation deterioration of the (meth)acrylic resin in the intermediate coating film is prevented, and the interfacial deterioration is prevented.

Here, in an embodiment of the prior art, in a case where the pigment contained in the intermediate coating film contains titanium oxide, if ultraviolet rays reach the intermediate coating film, due to the oxidation reaction by the photocatalyst effect of titanium oxide, interfacial deterioration between the intermediate coating film and the top coating film is likely to be promoted. Whereas, in the coated body of the present invention, as mentioned above, the ultraviolet rays hardly reach the intermediate coating film, whereby even if titanium oxide is contained in the intermediate coating film, deterioration of the intermediate coating film, or consequential interfacial peeling between the intermediate coating film and the top coating film, is less likely to occur.

Further, the present inventors have found that the coated body is excellent in the pressure marking resistance, since a prescribed curable fluorinated polymer is used at the time of producing the top coating film. Particularly, as described later in detail, it has been found that the pressure marking resistance is more excellent in a case where the elongation of the top coating film is set to be within a predetermined range.

In the following, first, the respective members (the substrate, the undercoating film, the intermediate coating film, and the top coating film) in the coated body of the present invention will be described in detail, and then, the method for producing the coated body will be described in detail.

The substrate in the present invention is not particularly limited, and an inorganic substrate composed of cement concrete, natural stone, glass, iron, steel, stainless steel, aluminum, copper, brass, titanium or the like, or an organic substrate composed of an acrylic resin, a polycarbonate, FRP, a resin-reinforced concrete or the like, may be used depending on the particular application and purpose.

Among them, in applications to exterior members of e.g. household appliances, furniture, building materials and automotive components, the substrate is preferably a metal plate (metal substrate) of e.g. iron, steel, stainless steel, aluminum, copper, brass, titanium, etc., and a steel plate is more preferred.

The type of the steel plate is not particularly limited, and it is possible to use a galvanized steel plate (electro-galvanized, hot-dip galvanized), a galvannealed steel plate (galvannealed i.e. hot-dip galvanization followed by alloying treatment), a zinc alloy-plated steel plate (molten zinc-magnesium plating, molten zinc-aluminum-magnesium plating, molten zinc-aluminum plating), a molten aluminum-plated steel plate, a molten zinc-silicon-plated steel plate, an electrolytic zinc-iron-plated steel plate, an electrolytic zinc-nickel-plated steel plate, an electrolytic zinc-chromium-plated steel plate, a multilayer-plated steel or stainless steel, made of a combination thereof, etc.

In a case where a metal plate (e.g. steel) is used as the substrate, with a view to improving the coating film adhesion and corrosion resistance, it is preferred to use a steel plate having a chemically treated coating film formed on its surface. The chemically treated coating film may be formed by a chemical treatment method such as coating chromate treatment, electrolytic chromate treatment, chromate-free treatment, phosphate treatment, etc.

The undercoating film in the present invention contributes to the coating film adhesion and corrosion resistance of the coated body.

The material constituting the undercoating film is not particularly limited, and an organic resin is preferred. The undercoating film is a coating film formed from an undercoating material, and the undercoating material is preferably a coating material containing an organic resin. The organic resin to be contained in the undercoating material may be a curable resin, and in such a case, the undercoating film will contain an organic resin made of a cured product of the curable resin.

As the organic resin to be contained in the undercoating material, from the viewpoint of adhesion to the substrate (or the chemically treated film) and the intermediate coating film, a (meth)acrylic resin, a polyester resin or an epoxy resin is preferred.

Further, as the organic resin, one type may be used alone, or two or more types may be used in combination.

The undercoating film may contain an anticorrosive pigment.

The anticorrosive pigment is not particularly limited and may, for example, be zinc phosphate, zinc phosphite, zinc magnesium phosphate, magnesium phosphate, magnesium phosphite, silica, calcium ion exchanged silica, zirconium phosphate, dihydrogen aluminum tripolyphosphate, zinc oxide, zinc phosphomolybdate, barium metaborate, etc.

The film thickness of the undercoating film is not particularly limited, and is preferably from 0.5 to 20 μm. When the film thickness is at least the lower limit value, it is easy to improve the adhesion and corrosion resistance of the undercoating film. On the other hand, when the film thickness is at most the upper limit value, it is possible to prevent formation of poor appearance such as irregularity surface on the undercoating film surface and to prevent formation of a defect (foaming) on the undercoating film surface at the time of forming the undercoating film by baking.

The undercoating film can be formed by a method of applying an undercoating material comprising an organic resin and any optional pigment, etc., to the surface of a substrate, followed by baking (drying and curing).

The coating method for the undercoating film is not particularly limited and may, for example, be brush coating, a dip coating method, a cast coating method, a spray coating method, a spinner coating method, a bead coating method, a wire bar coating method, a blade coating method, a roller coating method, a curtain coating method, a slit die coater method, a gravure coater method, a slit reverse coater method, a micro gravure method, an inkjet method, or a comma coater method.

Further, the baking temperature is preferably from 200 to 250° C. as the peak plate temperature of the substrate, and the baking time is preferably from 20 to 100 seconds.

The intermediate coating film in the present invention is a coating film formed from an intermediate coating material comprising a pigment, a polyvinylidene fluoride and a (meth)acrylic resin. The intermediate coating film improves the design properties of the coated body.

In the intermediate coating material, a polyvinylidene fluoride (hereinafter referred to also as "PVDF") is contained. In this specification, PVDF is meant for a homopolymer composed essentially of units based on $CH_2=CF_2$, but in the present invention, it may be a copolymer containing units based on a monomer other than $CH_2=CF_2$ within a range not to impair the effects of the present invention.

Further, the (meth)acrylic resin to be contained in the intermediate coating material is preferably a thermoplastic (meth)acrylic resin or a thermosetting (meth)acrylic resin, which has compatibility with PVDF. The (meth)acrylic resin is made of a homopolymer or copolymer of a (meth)acrylic acid ester, and may be a copolymer containing units based on a monomer other than a (meth)acrylic acid ester. In the case of a thermosetting (meth)acrylic resin, it is preferably composed of a copolymer having functional groups such as hydroxy groups or carboxy groups, and in such a case, it is usually used in combination with a curing agent.

The (meth)acrylic acid ester may, for example, be an alkyl (meth)acrylate having an alkyl group with at most 6 carbon atoms, other alkyl (meth)acrylates, a fluoroalkyl (meth)acrylate, a hydroxyalkyl (meth)acrylate, etc. The monomer other than a (meth)acrylic acid ester may be (meth)acrylic acid.

The (meth)acrylic resin is preferably a homopolymer or a copolymer of an alkyl (meth)acrylate having an alkyl group with at most 6 carbon atoms, such as methyl (meth)acrylate, ethyl (meth)acrylate, butyl (meth)acrylate, etc., or a copolymer composed mainly of such alkyl (meth)acrylate, with another monomer. Particularly preferred is a homopolymer of methyl methacrylate, or a copolymer composed mainly of methyl methacrylate, with another alkyl methacrylate.

The mass ratio of PVDF to the (meth)acrylic resin in the intermediate coating material (i.e. the mass of PVDF/the mass of the (meth)acrylic resin) is within a range of from 50/50 to 90/10 (in other words within a range of from 1 to 9), and from such a viewpoint that at least one of weather resistance and pressure marking resistance of the coated body is more excellent (hereinafter referred to also as "the viewpoint that the effect of the present invention is more excellent"), it is preferably from 55/45 to 85/15. If the mass ratio is less than 50/50, the coated body tends to be poor in weather resistance, and particularly, interfacial peeling tends to occur between the top coating film and the intermediate coating film. If the mass ratio exceeds 90/10, the intermediate coating film tends to be poor in adhesion to the undercoating film and the top coating film, and the intermediate coating film tends to be inferior in the processability.

The intermediate coating material contains a pigment. The pigment may, for example, be a coloring pigment, an extender pigment, a luster pigment, an anticorrosive pigment, etc., and it may be suitably selected for use depending upon the required characteristics such as design properties (color, luster, metallic, pearl, gradation, decoration, etc.) of the intermediate coating film, coating operation efficiency, the strength of the intermediate coating film, etc.

As the pigment, titanium oxide is particularly preferred. As mentioned above, in a case where the pigment contained in the intermediate coating film is titanium oxide, heretofore interfacial deterioration has been likely to occur between the intermediate coating film and the top coating film, but in the present invention, the interfacial deterioration is less likely to occur, whereby it is possible to use titanium oxide which is a general-purpose pigment.

The coloring pigment may, for example, be an inorganic pigment such as titanium oxide, carbon black, titanium yellow, iron oxide pigment, ultramarine, cobalt blue, chromium oxide, spinel green, chromic acid lead-type pigment, cadmium pigment, etc., or an organic pigment e.g. an azo-type pigment such as monoazo yellow, a phthalocyanine-type pigment such as phthalocyanine blue, phthalocyanine green, etc., or a condensed polycyclic pigment such as quinacridone red.

The extender pigment may, for example, be talc, mica, barium sulfate, clay, calcium carbonate, etc.

The luster pigment may, for example, be an aluminum powder pigment, a nickel powder pigment, a gold powder, a silver powder, a bronze powder, a copper powder, a stainless steel powder pigment, a mica pigment, a graphite pigment, a glass flake pigment, a metal coated glass powder, a metal coated mica powder, a metal coated plastic powder, a flaky iron oxide pigment, etc.

The anticorrosive pigment may, for example, be zinc phosphate, zinc phosphite, zinc magnesium phosphate, magnesium phosphate, magnesium phosphite, silica, calcium ion exchanged silica, zirconium phosphate, dihydrogen aluminum tripolyphosphate, zinc oxide, zinc phosphomolybdate, barium metaborate, etc.

The intermediate coating film is formed by a method of applying the intermediate coating material to the surface of the undercoating film, followed by baking (drying and curing).

Here, the intermediate coating material may contain a solvent. Specific examples of the solvent include an alcohol solvent, a saturated hydrocarbon solvent, an aromatic hydrocarbon solvent, a ketone solvent, an ester solvent, an amide solvent, etc.

The method for applying the intermediate coating material may suitably selected for use from the method for applying the undercoating material as described above.

Further, the baking temperature is preferably from 240 to 260° C. as the peak plate temperature of the substrate, and the drying time is preferably from 20 to 600 seconds.

The film thickness of the intermediate coating film is not particularly limited, but is preferably from 1 to 60 μm, more preferably from 5 to 40 μm. When the film thickness is at least the lower limit value, the intermediate coating film will be excellent in design properties (color, gloss, etc.). On the other hand, when the film thickness is at most the upper limit value, it is possible to prevent formation of poor appearance such as surface irregularities on the intermediate coating film, and it is possible to prevent a defect (foaming) on the surface the intermediate coating film at the time of forming the intermediate coating film by baking.

The top coating film of the present invention is a coating film formed by curing a top coating material comprising the following (1) to (3):

(1) a fluorinated polymer having hydroxy groups or carboxy groups, (2) a curing agent for curing the fluorinated polymer, (3) at least one ultraviolet absorber selected from the group consisting of an inorganic ultraviolet absorber, a salicylate-type ultraviolet absorber, a benzotriazole-type ultraviolet absorber, a hydroxyphenyl triazine-type ultraviolet absorber, a benzophenone-type ultraviolet absorber and a cyanoacrylate-type ultraviolet absorber.

The fluorinated polymer in the present invention has hydroxy groups or carboxy groups. The fluoropolymer may have only hydroxy groups or may have only carboxy groups, or may have both hydroxy groups and carboxy groups.

In a case where the fluorinated polymer has only hydroxy groups, the hydroxy value of the fluorinated polymer is preferably from 20 to 200 mg KOH/g, particularly preferably from 40 to 100 mg KOH/g, from the viewpoint of crosslinking density. Within this range, the flexibility of the top coating film, the adhesion between the top coating film and the intermediate coating film, etc. tend to be improved.

In a case where the fluorinated polymer has only carboxy groups, the acid value of the fluorinated polymer is preferably from 5 to 100 mg KOH/g, particularly preferably from 10 to 80 mg KOH/g, from the viewpoint of crosslinking density. Within this range, the flexibility of the top coating film, the adhesion between the top coating film and the intermediate coating film, etc. tend to be improved.

Here, the acid value and the hydroxy value are measured, respectively, in accordance with the methods of JIS K 0070-3 (1992), by dissolving a certain amount of the resin in a tetrahydrofuran (THF) solution, followed by titration with a KOH/ethanol solution using phenolphthalein as an indicator.

For such a reason that the effects of the present invention will be more excellent, the fluorinated polymer preferably comprises units based on a fluoroolefin (hereinafter referred to also as "units 1"), units based on a monomer having a hydroxy group or a carboxy group (hereinafter referred to also as "units 2") and units based on a monomer having a $C_{2-12}$ chain alkyl group (hereinafter referred to also as "units 3").

Units 1 are units based on a fluoroolefin.

The fluoroolefin is meant for a compound having some or all of hydrogen atoms bonded to ethylene substituted by fluorine atoms. The fluoroolefin may have a substituent atom or a substituent group other than a fluorine atom.

The fluoroolefin may be a $C_{2-6}$ fluoroolefin such as $CH_2=CF_2$, $CF_2=CHF$, $CF_2=CFCl$, $CF_2=CF_2$ or $CF_2=CFCF_3$. Among them, $CH_2=CF_2$, $CF_2=CF_2$, $CF_2=CFCF_3$ or $CF_2=CFCl$ is preferred, and from the viewpoint of weather resistance, $CF_2=CFCl$ or $CF_2=CF_2$ is more preferred, and $CF_2=CFCl$ is further preferred.

As units 1, one type may be contained alone, or two or more types may be contained in combination.

Units 2 are units based on a monomer having a hydroxy group, or units based on a monomer having a carboxy group.

A hydroxy group or a carboxy group in units 2 is a group reactive with a curing agent to be described later, and is used to form a crosslinked structure in the top coating film.

As units 2, one type may be contained alone, or two or more types may be contained in combination.

The monomer having a hydroxy group is not particularly limited so long as it is a compound having a hydroxy group and a polymerizable group (preferably a radical polymerizable group), and, for example, a hydroxyalkyl vinyl ether, a hydroxyalkyl carboxylic acid vinyl ester, a hydroxyalkyl allyl ether, a hydroxyalkyl carboxylic acid allyl ester, a hydroxyalkyl (meth)acrylate, etc. may be mentioned. As the monomer having a hydroxy group, a hydroxyalkyl vinyl ether is preferred, and a hydroxyalkyl vinyl ether having a hydroxyalkyl group with at most 6 carbon atoms, such as 2-hydroxyethyl vinyl ether, hydroxymethyl vinyl ether or 4-hydroxybutyl vinyl ether, is more preferred, and from such a viewpoint that the copolymerizability is excellent, and the top coating film to be formed will be excellent in weather resistance, 4-hydroxybutyl vinyl ether is particularly preferred.

The monomer having a carboxy group is not particularly limited so long as it is a compound having a carboxy group and a polymerizable group (preferably a radical polymerizable group), and (meth)acrylic acid, maleic acid, maleic anhydride, crotonic acid, undecenoic acid and β-carboxyethyl acrylate are preferred, and from such a viewpoint that the top coating film to be formed will be excellent in weather resistance, crotonic acid and undecenoic acid are particularly preferred.

Further, the fluorinated polymer in the present invention may be a polymer having hydroxy groups obtainable by saponifying a polymer comprising units based on a carboxylic acid vinyl ester, or may be a polymer having carboxy groups obtainable by reacting a polybasic carboxylic acid or its anhydride to a polymer based on a monomer having a hydroxy group.

Units 3 are units based on a monomer having a $C_{2-12}$ chain alkyl group. Here, the chain alkyl group is a linear or branched alkyl group. Further, the alkyl group does not have a functional group such as a hydroxy group or a carboxy group.

As the fluorinated polymer contains units 3, the wet-spreadability of the top coating material over the object to be coated (the intermediate coating film), the flexibility of the top coating film, the adhesion between the top coating film and the intermediate coating film, etc. tend to be easily improved. Further, it will be easy to adjust the later-described ratio of expansion and contraction of the top coating film within a suitable range.

The number of carbon atoms in the alkyl group is preferably from 2 to 11, more preferably from 2 to 10, from the above-mentioned viewpoint.

As units 3, one type may be contained alone, or two or more types may be contained in combination.

Specific examples of the monomer having a $C_{2-12}$ chain alkyl group, include an alkyl vinyl ether, an alkyl vinyl ester, an alkyl allyl ether, an alkyl allyl ester, and an alkyl (meth)acrylate. From such a viewpoint that the effects of the present invention will be more excellent, an alkyl vinyl ether having a $C_{2-12}$ alkyl group is preferred.

In the fluorinated polymer, units other than units 1, units 2 and units 3 (hereinafter referred to also as "units 4") may be contained.

Units 4 may be units based on a monomer having a cyclic hydrocarbon group with at least 3 carbon atoms. As such a monomer, a cycloalkyl vinyl ether such as cyclohexyl vinyl ether may be mentioned.

The ratio of units 1 to all units in the fluorinated polymer in the present invention is preferably from 20 to 80 mol %, more preferably from 30 to 70 mol %. When the ratio of units 1 is at least the lower limit value, light resistance of the top coating film will be more excellent. When it is at most the upper limit value, the elongation of the top coating film will be easily improved, and the adhesion between the top coating film and the intermediate coating film will be excellent.

Further, the ratio of units 2 to all units in the fluorinated polymer in the present invention is preferably from 0.5 to 60 mol %, more preferably from 1 to 50 mol %. When the ratio of units 2 is at least the lower limit value, the adhesion between the top coating film and the intermediate coating film will be excellent. When it is at most the upper limit value, the water resistance of the top coating film is less likely to be lowered.

Further, the ratio of units 3 to all units in the fluorinated polymer is preferably from 0.5 to 60 mol %, more preferably from 1 to 50 mol %, further preferably from 30 to 50 mol %. When the ratio of units 3 is at least the lower limit value, the elongation of the top coating film will be improved, and the processability of the coated body will be improved. When it is at most the upper limit value, the weather resistance of the top coating film will be easily improved.

Further, in a case where the fluorinated polymer contains units 4, the ratio of units 4 to all units in the fluorinated polymer is preferably at most 30 mol %, more preferably at most 10 mol %. The lower limit is not particularly limited, but is more than 0 mol %. However, from such a viewpoint that the effects of the present invention will be more excellent, particularly with a view to adjusting the later-described ratio of expansion and contraction of the top coating film within a preferred range, the fluorinated polymer preferably contains no units 4.

The method for producing a fluorinated polymer of the present invention is not particularly limited, and preferred is a method of copolymerizing monomers capable of forming units 1, units 2 and units 3, respectively, by the action of a radical initiator. The polymerization form is not particularly limited, and it is possible to adopt solution polymerization, suspension polymerization or emulsion polymerization using a polymerization solvent.

The reaction temperature during the polymerization is preferably from 0 to 130° C. The reaction time is preferably from 1 to 50 hours.

As the polymerization solvent, an alcohol solvent such as ethanol, butanol or propanol, a saturated hydrocarbon solvent such as n-hexane or n-heptane, an aromatic hydrocarbon solvent such as toluene or xylene, a ketone solvent such as methyl ethyl ketone or cyclohexanone, or an ester solvent such as ethyl acetate or butyl acetate, may be mentioned. Further, it is also possible to use these solvents as mixed.

As the radical polymerization initiator, a peroxydicarbonate, a peroxyester, a ketone peroxide, a peroxy ketal, a peroxy carbonate ester, a diacyl peroxide, a dialkyl peroxide or the like, may be mentioned.

The curing agent in the present invention is made of a compound having at least two functional groups, per molecule, which are reactive with hydroxy groups or carboxy groups in the fluorinated polymer. The functional groups may be blocked functional groups so as to be activated under curing conditions. The functional groups reactive with hydroxy groups or carboxy groups, may, for example, be isocyanate groups, blocked isocyanate groups, alkoxysilyl groups, carbodiimide groups, oxazoline groups, epoxy groups, methylol groups, alkyl etherified methylol groups, hydrazide groups, or β-hydroxyalkylamide groups.

Types of functional groups that one curing agent has, are not particularly limited, but usually one type.

Further, the total number of functional groups that one curing agent has in one molecule, is not particularly limited, but is usually from 2 to 40, preferably from 2 to 30.

As the curing agent, one type may be used alone, or two or more types may be used in combination.

A curing agent having isocyanate groups is a polyvalent isocyanate compound having isocyanate groups not blocked. As the polyvalent isocyanate compound, preferred is a polyvalent isocyanate compound having no isocyanate group directly bonded to an aromatic nucleus. Specifically, an aliphatic polyvalent isocyanate compound such as tetramethylene diisocyanate, hexamethylene diisocyanate, hexamethylene triisocyanate or lysine diisocyanate, an alicyclic polyvalent isocyanate compound such as isophorone diisocyanate, dicyclohexylmethane diisocyanate or diisocyanate methyl cyclohexane, or an aromatic isocyanate compound such as m-xylene diisocyanate or p-xylene diisocyanate, may be mentioned.

Further, as the curing agent having isocyanate groups, a modified product of a polyvalent isocyanate compound may also be mentioned, and specifically, an urethane modified product, a urea modified product, an isocyanurate modified product, a biuret modified product, an allophanate modified product, a carbodiimide modified product or the like may be mentioned. As the modified product of a polyvalent isocyanate compound, an isocyanurate-modified product, a biuret modified product or an urethane modified product is preferred, and an isocyanurate modified product is more preferred.

The curing agent having blocked isocyanate groups may, for example, be a compound having isocyanate groups in the above polyvalent isocyanate compound blocked with a blocking agent. Here, the blocked isocyanate groups will be deblocked by heating, etc. at the time of curing, to become reactive isocyanate groups. Specifically, a compound having blocked isocyanate groups may be mentioned which is obtainable by reacting a polyvalent isocyanate compound and a blocking agent (an alcohol, caprolactam, methyl ethyl ketoxime, an organic acid ester, etc.).

Specific examples of the curing agent having alkoxysilyl groups include a tetra-functional alkoxysilane such as tetramethoxysilane, tetraethoxysilane or tetraisopropoxysilane, a trifunctional alkoxysilane such as triethoxyvinylsilane, methyltrimethoxysilane or methyltriethoxysilane, and a bifunctional alkoxysilane such as dim ethyldimethoxysilane or diphenyldimethoxysilane.

Specific examples of the curing agent having carbodiimide groups include "UCARLNK" manufactured by Union Carbide Corporation, "CARBODILITE" manufactured by Nisshinbo Chemical Inc., etc.

Specific examples of the curing agent having oxazoline groups include "Epocros" manufactured by Nippon Shokubai Co., Ltd., etc.

Specific examples of the curing agent having epoxy groups include ethylene glycol diglycidyl ether, polyethylene glycol diglycidyl ether, propylene glycol diglycidyl ether, etc.

Specific examples of the curing agent having methylol groups or alkyl etherified methylol groups, include methylol melamine, butyl etherified methylol melamine, methylol urea, butyl etherified methylol urea, etc.

Specific examples of the curing agent having hydrazide groups, include a dicarboxylic acid dihydrazide, an aliphatic dihydrazine, etc.

Specific examples of the curing agent having 3-hydroxyalkylamide groups include "Primid XL-552" manufactured by EMS Chemie Ltd, etc.

The curing agent in the present invention is preferably suitably selected for use depending upon the type of the fluorinated polymer, and in the case of a fluorinated polymer having hydroxy groups, it is preferred to select a curing agent having isocyanate groups or blocked isocyanate groups, and in the case of a fluorinated polymer having carboxy groups, it is preferred to select a curing agent having carbodiimide groups, oxazoline groups, epoxy groups or β-hydroxyalkylamide groups. In such a case, not only the weather resistance and pressure marking resistance will be excellent, but also it will be easy to adjust the later-described breaking stress value of the top coating film within a suitable range.

The ultraviolet absorber in the present invention is at least one ultraviolet absorber selected from an inorganic ultraviolet absorber, a salicylate-type ultraviolet absorber, a benzotriazole-type ultraviolet absorber, a hydroxyphenyl triazine-type ultraviolet absorber, a benzophenone-type ultraviolet absorber and a cyanoacrylate-type ultraviolet absorber, and from the viewpoint of dispersibility in the coating film, at least one organic ultraviolet absorber selected from a salicylate-type ultraviolet absorber, a benzotriazole-type ultraviolet absorber, a hydroxyphenyl triazine-type ultraviolet absorber, a benzophenone-type ultraviolet absorber and a cyanoacrylate-type ultraviolet absorber is preferred.

As the ultraviolet absorber, one type may be used alone, or two or more types may be used in combination.

Specific examples of the inorganic ultraviolet absorber include titanium oxide, zinc oxide, cerium oxide, iron oxide, etc. Further, an ultraviolet absorber having a multilayered structure may also be used in order to improve the dispersibility in the resin, and, for example, it is possible to use an ultraviolet absorber composed of composite particles having a three-layer structure of amorphous silica-cerium oxide-base pigment as described in JP-A-10-292056.

Specific examples of the salicylate-type ultraviolet absorber include phenyl salicylate, p-octylphenyl salicylate, etc.

Specific examples of the benzotriazole-type ultraviolet absorber include isooctyl-3-[3-(2H-benzotriazol-2-yl)-5-tert-butyl-4-hydroxyphenyl]propionate ("TINUVIN384" manufactured by BASF), 2-(3-dodecyl-5-methyl-2-hydrophenyl)benzotriazole ("TINUVIN571" manufactured by BASF), 2,2-(2H-benzotriazol-2-yl)-4,6-bis(1-methyl-1-phenol-ethyl)phenol ("TINUVIN900" manufactured by BASF), etc.

Examples of the hydroxyphenyl triazine-type ultraviolet absorber include a reaction product of 2-(4,6-bis(2,4-dimethylphenyl)-1,3,5-triazin-2-yl)-5-hydroxyphenyl and [($C_{10}$ to $C_{16}$, mainly $C_{12}$ to $C_{13}$ alkyloxy)methyl] oxirane ("TINUVIN400" manufactured by BASF), a reaction product of 2-(2,4-dihydroxyphenyl)-4,6-bis-(2,4-dim ethylphenyl)-1,3,5-triazine and a (2-ethylhexyl)-glycidic acid ester ("TINUVIN405" manufactured by BASF), 2,4-bis[2-hydroxy-4-butoxyphenyl]-6-(2,4-dibutoxyphenyl)-1,3,5-triazine ("TINUVIN460" manufactured by BASF), 2-(4,6-diphenyl-1,3,5-triazin-2-yl)-5-[(hexyl)oxy]-phenol (e.g. "TINUVIN1577" manufactured by BASF), 2-(2-hydroxy-4-[1-octyloxycarbonylethoxy]phenyl)-4,6-bis(4-phenylphenyl)-1,3,5-triazine ("TINUVIN479" manufactured by BASF), etc.

Specific examples of the benzophenone-type ultraviolet absorber include 2-hydroxy-4-methoxybenzophenone, 2-hydroxy-4-methoxy-2'-carboxybenzophenone, 2-hydroxy-4-octyloxybenzophenone, etc.

Specific examples of the cyanoacrylate-type ultraviolet absorber include ethyl-2-cyano-3,3'-diphenyl acrylate, methyl-2-cyano-3-methyl-3-(p-methoxyphenyl) acrylate, etc.

In the present invention, in the top coating material, the composition of the fluorinated polymer, the curing agent, the ultraviolet absorber and optional components other than those (a curing catalyst, a pigment, a light stabilizer, a surface modifier, a pigment dispersing agent, a defoamer, a thickening agent, an adhesion improving agent, a matting agent, etc.) is not particularly limited.

The content of the fluorinated polymer is preferably from 10 to 80 mass %, more preferably from 20 to 80 mass %, to the total solid content in the top coating material. When the content of the fluorinated polymer is at least the lower limit value, the weather resistance of the coated body will be more excellent. When the content of the fluorinated polymer is at most the upper limit value, it will be easy to design the viscosity of the top coating material to be optimum for coating operation.

The content of the curing agent is preferably from 1 to 40 mass %, more preferably from 3 to 30 mass %, to the fluorinated polymer. When the content of the curing agent is at least the lower limit value, a stronger top coating film tends to be obtained by sufficient crosslinking. When the content of the curing agent is at most the upper limit value, the elongation of the top coating film tends to be improved, and it tends to be easy to prevent foaming of the top coating film during the curing.

The content of the ultraviolet absorber is preferably from 0.1 to 15 mass % to the fluorinated polymer. When the content of the ultraviolet absorber is at least the lower limit value, the coated body will be more excellent in weather resistance, and even when the coated body is used outdoors, etc. for a long period of time, peeling of the top coating film is unlikely to occur. When the content of the ultraviolet absorber is at most the upper limit value, at the time of forming a top coating film by heat curing, a defect of color change such as yellowing, etc. is less likely to occur in the top coating film.

In a case where as an optional component, for example, a pigment is added to the top coating material, the content of the pigment is preferably from 50 to 500 parts by mass, more preferably from 100 to 400 parts by mass, to 100 parts by mass of the solid content other than the pigment in the top coating material.

In the case of adding a curing catalyst to the top coating material, the content of the curing catalyst is preferably from 0.001 to 10.0 mass % to the curing agent. When the content of the curing catalyst is at least the lower limit value, the catalytic effects tend to be easily obtainable. When the content of the curing catalyst is at most the upper limit value, it tends to be easy to prevent lowering of the water resistance of the coating film due to remaining of the curing catalyst.

The top coating material may contain, as an optional component, a non-fluorinated resin. The non-fluorinated resin may be a thermoplastic resin or thermosetting resin containing no fluorine atom. The thermosetting resin is preferably used in combination with the above-mentioned curing agent or another curing agent, depending on its reactive groups. The non-fluorinated resin is preferably at least one non-fluorinated resin selected from the group consisting of (meth)acrylic resins, polyester resins and epoxy resins. The non-fluorinated resin may be optionally used depending upon the required characteristics such as the appearance and mechanical properties of the top coating film, processability during application of the top coating material, etc.

Further, in the case of using the non-fluorinated resin, the mass ratio of the fluorinated polymer to the non-fluorinated resin (mass of the fluorinated polymer/mass of the non-fluorinated resin) is preferably from 86/14 to 99/1.

The top coating material can be produced by mixing the above-described fluorinated polymer, curing agent, ultraviolet absorber and optional components. The order of mixing the respective components is not particularly limited.

The method for mixing is also not particularly limited, and the mixing can be carried out by means of a ball mill, a paint shaker, a sand mill, a jet mill, a rocking mill, an attritor, a three-roll mill, a kneader, a planetary mixer, a stirring high speed homogenizer using a stirrer and a magnetic stirrer, a disperser, a twin-screw agitator, etc.

Further, in a case where the top coating material contains a solvent, it is possible to improve the coating properties of the top coating material. As the solvent, an alcohol solvent, a saturated hydrocarbon solvent, an aromatic hydrocarbon solvent, a ketone solvent, an ester solvent, and an amide solvent may be mentioned. Further, these solvents may be used as mixed.

The content of the solid content in the top coating material may be determined depending upon the solubility, coating conditions, etc., and specifically, the content of the solid content is preferably from 20 to 95 mass %, more preferably from 30 to 90 mass %, in the top coating material including a solvent. When the solid content is at most the upper limit value, the fluidity of the top coating material can be secured, and application of the top coating material tends to be easy. When the content of solid content is at least the lower limit value, baking (drying and curing) after applying the top coating material will be facilitated, and it tends to be easy to prevent occurrence of defects (foaming) on the surface of the top coating film at the time of heating and removing the solvent.

The top coating film in the present invention can be formed by a method of applying the top coating material to the surface of the intermediate coating film, followed by baking (drying and curing).

The method for applying the top coating material may be suitably selected for use among the above-described methods for applying the undercoating material.

Further, the baking temperature is preferably from 10 to 250° C., more preferably from 30 to 240° C., further preferably from 50 to 230° C., as the peak plate temperature of the substrate. The drying time is preferably from 10 seconds to 24 hours, more preferably from 11 seconds to 10 hours, further preferably from 12 seconds to 1 hour.

The thickness of the top coating film is not particularly limited, but is preferably from 1 to 60 μm, more preferably from 5 to 40 μm. When the film thickness is at least the lower limit value, a top coating film excellent in weather resistance tends to be easily obtained. On the other hand, when the film thickness is at most the upper limit value, it is possible to prevent formation of a poor appearance of irregularity surface on the surface of the top coating film, and to prevent formation of defects (foaming) at the surface of the top coating film at the time of forming the top coating film by baking.

The elongation of the top coating film in the present invention is not particularly limited, but is preferably from 50 to 200%, more preferably from 60 to 150%. When the elongation is within the above range, the processability of the coated body will be more excellent. Further, at the time of transporting the coated body, it is possible to prevent formation of contact scratches.

Here, the elongation of the top coating film is an elongation at the time when the above-described top coating material is alone made into a coating film, and the elongation is the elongation (%) at break of the coating film as measured by the method in accordance with JIS K 7127 (1999).

The breaking stress of top coating film in the present invention is not particularly limited, but is preferably from 5.0 to 40.0 MPa, more preferably from 10.0 to 30.0 MPa. When the breaking stress is within the above range, the pressure marking resistance will be more excellent. Further, at the time of transporting the coated body, it is possible to prevent formation of contact scratches.

Here, the breaking stress is meant for the breaking stress (MPa) of the top coating film as measured by the method in accordance with JIS K 7127 (1999).

The glass transition temperature of the top coating film in the present invention is not particularly limited, but is preferably from −15 to 40° C., more preferably from −10 to 35° C. When the glass transition temperature is within the above range, cracking is less likely to occur in the top coating film even at an area where weather conditions are severe (at an area where the difference between hot and cold is severe).

Here, the glass transition temperature is meant for the glass transition temperature (° C.) of the top coating film as measured by the tensile load method using a thermal mechanical analyzer (TMA).

As a preferred embodiment of the top coating film to exhibit the above-described elongation, breaking stress and glass transition temperature, an embodiment may be mentioned wherein as the fluorinated polymer, a fluorinated polymer comprising units 1, units 2 and units 3, having a hydroxy value of from 20 to 200 mg KOH/g and having hydroxy groups, is used, and as the curing agent, a curing agent having isocyanate groups or blocked isocyanate groups, is used. More preferred embodiments of the fluorinated polymer and the curing agent in the above embodiment are, respectively, as described above.

The coated body of the present invention can be applied to various applications. For example, exterior members of e.g. household appliances, furniture, building materials and automobile parts, exterior materials of e.g. road members (guardrails or poles, display boards, etc.), roofing and ships, exterior materials of aircrafts, power device members, etc. may be mentioned. In particular, a coated steel plate obtainable by using a steel plate as the substrate can be suitably applied to the above applications (particularly to a building exterior member).

EXAMPLES

In the following, the present invention will be described in further detail with reference to Examples, but the present invention is not limited thereto.

Synthesis Example 1: Production of Fluorinated Polymer (A)

Into a pressure-resistant reactor with an internal capacity of 2,500 mL equipped with a stainless steel stirrer, 832 g of xylene, 238 g of ethanol, 129 g of 4-hydroxybutyl vinyl ether (hereinafter referred to also as "HBVE"), 325 g of ethyl vinyl ether (hereinafter referred to also as "EVE"), 11 g of calcium carbonate, and 3.5 g of t-butyl peroxypivalate (hereinafter referred to also as "PBPV") were charged, and dissolved oxygen in the liquid was removed by degassing with nitrogen.

Then, 660 g of $CF_2$=CFCl (hereinafter referred to also as "CTFE") was introduced into the reactor, the temperature was gradually raised, and the reaction was continued while maintaining the temperature of the reaction solution at 65° C. After reacting for 10 hours, the reactor was cooled to stop the reaction. After cooling the reaction liquid to room temperature, unreacted monomers were purged, and the obtained reaction liquid was filtered through diatomaceous earth to remove solid content. Then, a part of xylene and ethanol were removed by vacuum distillation to obtain a xylene solution (nonvolatile content: 50%) of a fluorinated polymer having a hydroxy value of 56 mg KOH/g (fluorinated polymer (A)).

Synthesis Example 2: Production of Fluorinated Polymer (B)

Into a pressure-resistant reactor with an internal capacity of 2,500 mL equipped with a stainless steel stirrer, 590 g of xylene, 170 g of ethanol, 129 g of HBVE, 206 g of EVE, 208 g of cyclohexyl vinyl ether (hereinafter referred to also as "CHVE"), 11 g of calcium carbonate and 3.5 g of PBPV were charged, and dissolved oxygen in the liquid was removed by degassing with nitrogen.

Then, 660 g of CTFE was introduced into the reactor, the temperature was gradually raised, and the reaction was continued while maintaining the temperature of the reaction liquid at 65° C. After reacting for 10 hours, the reactor was cooled to stop the reaction. After cooling the reaction liquid to room temperature, unreacted monomers were purged, and the obtained reaction liquid was filtered through diatomaceous earth to remove solid content. Then, a part of xylene and ethanol were removed by vacuum distillation to obtain a xylene solution (nonvolatile content: 60%) of a fluorinated polymer having a hydroxy value of 52 mg KOH/g (fluorinated polymer (B)).

(Production of Top Coating Material (I))

To 120 g of the xylene solution (nonvolatile content: 50%) of the fluorinated polymer (A), 11.8 g of isocyanurate-modified HDI ("Coronate HX" manufactured by Nippon Polyurethane Industry Co., Ltd.) being an isocyanurate-modified product of hexamethylene diisocyanate as a curing agent, 80 g of xylene, and, as curing catalysts, dibutyltin dilaurate (one diluted from 4 to 10 fold with xylene to 4.2 g), 4.8 g of benzotriazole-type ultraviolet absorber 1 ("TINUVIN384" manufactured by BASF) and 2.4 g of hydroxyphenyl triazine-type ultraviolet absorber 1 ("TINUVIN400" manufactured by BASF) were further added and mixed to obtain a top coating material (I).

(Production of Top Coating Material (II))

To 100 g of the xylene solution (nonvolatile content: 60%) of the fluorinated polymer (B), 10.7 g of isocyanurate-modified HDI as a curing agent, 100 g of xylene, and as curing catalysts, dibutyltin dilaurate (one diluted from 4 to 10 fold with xylene to 4.2 g), 5.0 g of benzotriazole-type ultraviolet absorber 1, and 2.5 g of hydroxyphenyl triazine-type ultraviolet absorber 1 were further added and mixed to obtain a top coating material (II).

(Production of Top Coating Material (III))

To 42.0 g of polyvinylidene fluoride ("KYNAR 500" manufactured by Arkema Inc., hydroxy value: 0 mg KOH/g), 18.0 g of an acrylic resin ("PARALOID B-44" manufactured by Dow Chemical Company), 84.0 g of isophorone, 42.0 g of xylene 14.0 g of dimethylformamide, 5.0 g of benzotriazole-type ultraviolet absorber 1, and 2.5 g of hydroxyphenyl triazine-type ultraviolet absorber 1 were added and mixed to obtain a top coating material (III).

<Evaluation of Coating Film (Top Coating Film)>

On the surface of a glass substrate, the top coating material (I) was applied so that the thickness of a coating film after drying (hereinafter simply referred to as "dried film thickness") would be 20 μm and held together with the substrate in a hot air drying oven of 160° C. for 20 minutes, for drying and curing to form a coating film, thereby to obtain a coating film-attached test plate. Thereafter, the coating film was peeled off from the glass substrate, and the peeled coating film was punched into a dumbbell No. 1 shape prescribed in the Japanese Industrial Standard JIS K 6251 to obtain a coating film test specimen (SI).

A coating film test specimen (SII) was obtained in accordance with the same procedure as in Example 1 except that the top coating material (II) was used in place of the top coating material (I).

A coating film test specimen (SIII) was obtained in accordance with the same procedure as in Example 1 except that the top coating material (III) was used in place of the top coating material (I), and the drying and curing conditions were changed to 250° C. for 10 minutes.

<Breaking Stress and Elongation>

The breaking stress and elongation of each of coating film test specimens (SI) to (SIII) prepared, were measured by the methods in accordance with JIS K 7127 (1999).

Specifically, using Orientec Co. tensile tester (model; RTC-1310A), each of coating film test specimens (SI) to (SIII) was pulled at a tensile rate of 50 mm/min, whereby the breaking stress and the elongation at the time of breakage of each coating film test specimen were calculated. The test was carried out at 23° C. in an environment of 60% RH. The results are summarized in Table 1.

<Glass Transition Temperature (Tg)>

The glass transition temperature (Tg) of each of the coating film test specimens (SI) to (SIII) prepared, was measured by using a thermal mechanical analyzer TMA/SS150 (manufactured by Seiko Instruments). The test method was the tensile load method. By setting the temperature raising rate to be 10° C./min and the load to be 49 mN, the temperature at which the elongation of each coating film test specimen changed suddenly was taken as the glass transition temperature (° C.). The results are summarized in Table 1.

TABLE 1

| Test specimen | Breaking stress (MPa) | Elongation (%) | Glass transition temperature (° C.) |
|---|---|---|---|
| SI | 18.5 | 119 | 30.2 |
| SII | 37.9 | 18.1 | 33.5 |
| SIII | 26.3 | 183 | 10.3 |

(Production of Intermediate Coating Material)

To 10.0 g of a (meth)acrylic resin ("PARALOID B-44" manufactured by Dow Chemical Company; resin solid content: 100%) made of a methyl methacrylate-type polymer, 40.0 g of a titanium oxide pigment ("Tie Pure R960" manufactured by Du Pont; titanium oxide content: 89 mass %, coating metal: silica, alumina), 32.7 g of isophorone, 13.0 g of xylene, and 4.3 g of dimethylformamide were added, and further, 100 g of glass beads having a diameter of 1 mm were added, whereupon the mixture was stirred for 2 hours in a paint shaker. After the stirring, glass beads were removed by filtration to obtain a pigment composition.

Next, to 41.1 g of the above pigment composition, 25.9 g of polyvinylidene fluoride ("KYNAR 500" manufactured by Arkema Inc.; resin solid content: 100%), and 33.0 g of isophorone were added and mixed, to obtain an intermediate coating material.

Example 1

On a zinc phosphate-treated plated steel sheet with a thickness of 0.8 mm, an undercoating material comprising an epoxy resin ("Fine Tough C800P primer" manufactured by Nippon Fine Coatings, Inc.) and the above-mentioned (meth)acrylic resin, was applied so as to be a dried film thickness of 5 μm, and baked at a peak plate temperature of 200° C., to form an undercoating film.

Then, on the undercoating film, the above-described intermediate coating material was applied so that the dried film thickness would be 30 μm, and baked at 250° C. for 10 minutes to form an intermediate coating film.

Next, on the intermediate coating film, the top coating material (I) was applied so that the dried film thickness would be 10 μm, and baked at 160° C. for 20 minutes to form a top coating film, thereby to obtain a coated metal plate.

Example 2

A coated metal plate was obtained in accordance with the same procedure as in Example 1 except that the top coating material (II) was used in place of the top coating material (I).

Comparative Example 1

A coated metal plate was obtained in accordance with the same procedure as in Example 1 except that the top coating material (Ill) was used in place of the top coating material (I), and the baking conditions for forming the top coating film were changed from 160° C. for 20 minutes to 250° C. for 10 minutes.

<Pressure Marking Resistance>

The pressure marking resistance of each coated metal plate was evaluated by the following method. A mirror-finished stainless steel plate was pressed onto the top coating film surface of the coated metal plate at a pressure of 29 kPa and kept for 60 seconds. Thereafter, the stainless steel plate was removed, followed by being left to stand at room temperature for 3 hours, whereupon the presence or absence of crimp marks on the top coating film was observed. The results were evaluated in accordance with the following standards. The results are summarized in Table 2. Here, practically, at least "Δ" is useful, and "○" is preferred.

○: No crimp marks were observed.
Δ: Crimp marks were slightly observed
x: Crimp marks were observed.

<Accelerated Weathering Test>

With respect to each of the coated metal plates, an accelerated weathering test was carried out. In the test, using the Accelerated Weathering Tester (Model: QUV/SE manufactured by Q-PANEL LAB PRODUCTS), the presence or absence of peeling of the coating film after exposure for 5,000 hours was observed. The results were evaluated in accordance with the following standards. The results are summarized in Table 2. Here, practically, "○" is useful.

○: No peeling of the coating film was observed.
x: Peeling of the coating film was observed.

<Actual Exposure Test>

With respect to each of the coated metal plates, the actual exposure test was carried out. In the test, the coated metal plate set outdoors in Naha city, Okinawa prefecture was installed so that the coated surface of the metal plate faced south at 45°, and the presence or absence of peeling of the coating film after 5 years from initiation of the installation, was evaluated in accordance with the following standards. The results are summarized in Table 2. Here, practically, "○" is useful.

○: No peeling of the coating film was observed.
x: Peeling of the coating film was observed.

TABLE 2

| | Pressure marking resistance | Accelerated weathering test | Actual exposure test |
|---|---|---|---|
| Example 1 | ○ | ○ | ○ |
| Example 2 | Δ | ○ | ○ |
| Comparative Example 1 | ○ | X | X |

As shown in Table 2, a coated metal plate of the present invention was excellent in pressure marking resistance, and further, the results of the accelerated weathering test and the actual exposure test were good, and thus, it was excellent in weather resistance.

When Example 1 and Example 2 are compared, the coated metal plate using the top coating material (I) was superior in pressure marking resistance to the coated metal plate using the top coating material (II).

When Examples 1 and 2 and Comparative Example 1 are compared, in Comparative Example 1 representing a metal plate having a top coating film formed by using the coating material containing the polyvinylidene fluoride and the acrylic resin, the pressure marking resistance was good, but as the results of the accelerated weathering test and the actual exposure test, peeling of the coating film occurred, whereby the weather resistance was not at a level which is required recently.

The coating film at the peeled surface in Comparative Example 1 was evaluated by using the Fourier transform infrared spectroscopy (FTIR), and as a result, disappearance of carbonyl groups resulting from decomposition of the acrylic resin was confirmed. This is considered to be such that by the accelerated weathering test and the actual exposure test, the interface between the respective coating films was degraded by light deterioration of the acrylic resin, the photocatalytic degradation due to titanium oxide, etc., and consequently peeling of the coating film occurred.

This application is a continuation of PCT Application No. PCT/JP2016/087427, filed on Dec. 15, 2016, which is based upon and claims the benefit of priority from Japanese Patent Application No. 2015-247664 filed on Dec. 18, 2015. The contents of those applications are incorporated herein by reference in their entireties.

What is claimed is:

1. A coated body comprising a substrate, an undercoating film, the following intermediate coating film and the following top coating film in this order,
   Intermediate coating film: a coating film formed from an intermediate coating material comprising a pigment, a polyvinylidene fluoride and a (meth)acrylic resin, wherein the mass ratio of the polyvinylidene fluoride to the (meth)acrylic resin (i.e. the mass ratio of the polyvinylidene fluoride/the (meth)acrylic resin) is from 50/50 to 90/10,
   Top coating film: a coating film formed by curing a top coating material comprising the following (1) to (3):
   (1) a fluorinated polymer having hydroxy groups or carboxy groups, wherein the fluorinated polymer having hydroxy groups or carboxy groups comprises units based on a monomer having a hydroxy group or a monomer having a carboxy group, and the monomer having a hydroxy group is selected from the group consisting of a hydroxyalkyl vinyl ether, a hydroxyalkyl carboxylic acid vinyl ester, a hydroxyalkyl allyl ether, a hydroxyalkyl carboxylic acid allyl ester, a hydroxyalkyl (meth)acrylate,
   (2) a curing agent for curing the fluorinated polymer,
   (3) at least one ultraviolet absorber selected from the group consisting of an inorganic ultraviolet absorber, a salicylate-type ultraviolet absorber, a benzotriazole-type ultraviolet absorber, a hydroxyphenyl triazine-type ultraviolet absorber, a benzophenone-type ultraviolet absorber and a cyanoacrylate-type ultraviolet absorber, wherein said top coating film does not contain titanium oxide.

2. The coated body according to claim 1, wherein the elongation of the top coating film is from 50 to 200%.

3. The coated body according to claim 1, wherein the breaking stress of the top coating film is from 5.0 to 40.0 MPa, and the glass transition temperature of the top coating film is from −15 to 40° C.

4. The coated body according to claim 1, wherein the fluorinated polymer comprises units based on a fluoroolefin, the units based on a monomer having a hydroxy group or a monomer having a carboxy group, and units based on a monomer having a $C_{2-12}$ chain alkyl group.

5. The coated body according to claim 1, wherein the curing agent is a curing agent having an isocyanate group or a blocked isocyanate group.

6. The coated body according to claim 1, wherein the fluorinated polymer comprises units based on a fluoroolefin, the units based on a monomer having a hydroxy group, and units based on a monomer having a $C_{2-12}$ chain alkyl group, and has a hydroxy value of from 20 to 200 mg KOH/g.

7. The coated body according to claim 1, wherein the pigment contains titanium oxide.

8. The coated body according to claim 1, wherein the undercoating film is a coating film formed from a coating material containing a (meth)acrylic resin, a polyester resin or an epoxy resin.

9. The coated body according to claim 1, wherein the substrate is a metal plate.

10. A building exterior member comprising a coated body as defined in claim 1.

11. The coated body according to claim 1, wherein the fluorinated polymer comprises,
    from 20 to 80 mol % of units based on a fluoroolefin,
    from 0.5 to 60 mol % of group the units based on a monomer having a hydroxy group or a monomer having a carboxy group,
    from 0.5 to 60 mol % of units based on a monomer having a $C_{2-12}$ chain alkyl group, and
    from 0 to 30 mol % of units based on a monomer having a cyclic hydrocarbon group with at least 3 carbon atoms,
    to all units in the fluorinated polymer.

12. The coated body according to claim 4, wherein the monomer having a $C_{2-12}$ chain alkyl group is selected from the group consisting of an alkyl vinyl ether, an alkyl vinyl ester, an alkyl allyl ether, an alkyl allyl ester, and an alkyl (meth)acrylate.

13. The coated body according to claim 4, wherein the content of the units based on a monomer having the above chain alkyl group is at least 30 mol %, to all units in the fluorinated polymer.

14. The coated body according to claim 1, wherein the content of the ultraviolet absorber is from 0.1 to 15 mass % to the fluorinated polymer.

15. The coated body according to claim 1, wherein the fluorinated polymer contains hydroxy groups and does not contain carboxy groups.

16. The coated body according to claim 1, wherein the content of the ultraviolet absorber is from 12.0 to 15.0 mass % to the fluorinated polymer.

* * * * *